(12) United States Patent
Lee

(10) Patent No.: US 10,559,105 B2
(45) Date of Patent: Feb. 11, 2020

(54) IMPLEMENTING INTERACTIVE HIERARACHICAL CHART LEGEND DATA DISPLAY

(71) Applicant: International Business Machines Corporation, Armonk, NY (US)

(72) Inventor: Grace H. Lee, North York (CA)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 15/863,192

(22) Filed: Jan. 5, 2018

(65) Prior Publication Data

US 2019/0213762 A1    Jul. 11, 2019

(51) Int. Cl.
| | | |
|---|---|---|
| *G06T 11/20* | (2006.01) | |
| *G06F 16/22* | (2019.01) | |
| *G06F 16/26* | (2019.01) | |
| *G06F 3/0485* | (2013.01) | |
| *G06F 3/0481* | (2013.01) | |
| *G06F 3/0484* | (2013.01) | |

(52) U.S. Cl.
CPC ........ *G06T 11/206* (2013.01); *G06F 3/04817* (2013.01); *G06F 3/04842* (2013.01); *G06F 3/04855* (2013.01); *G06F 16/2246* (2019.01); *G06F 16/26* (2019.01)

(58) Field of Classification Search
CPC ..... G06T 11/206; G06F 16/2246; G06F 16/26
USPC ....................................................... 345/440
See application file for complete search history.

(56) References Cited

U.S. PATENT DOCUMENTS

| | | | | |
|---|---|---|---|---|
| 5,414,809 | A | * | 5/1995 | Hogan .................. G06F 3/0481 715/765 |
| 7,605,813 | B2 | | 10/2009 | Uthe |
| 7,639,256 | B1 | * | 12/2009 | Yablonski ............. G06T 11/206 345/440 |
| 9,418,456 | B2 | | 8/2016 | Cardno |
| 9,613,086 | B1 | | 4/2017 | Sherman |
| 2008/0172414 | A1 | * | 7/2008 | Tien ....................... G06Q 10/06 |
| 2008/0307369 | A1 | | 12/2008 | Liu et al. |
| 2013/0113820 | A1 | * | 5/2013 | Molesky ................. G06T 11/00 345/592 |
| 2015/0170382 | A1 | | 6/2015 | Bhatia |
| 2017/0032026 | A1 | | 2/2017 | Parker et al. |

OTHER PUBLICATIONS

Toshiyuki Asahi et al., "Using treemaps to visualize the Analytic Hierarchy Process" Human-Computer Interaction Laboratory, University of Maryland, College Park, MD USA, pp. 1-18 https://www.cs.umd.edu/~ben/papers/Asahi1995Using.pdf.

* cited by examiner

*Primary Examiner* — Hao Tao Sun
(74) *Attorney, Agent, or Firm* — Peter J. Edwards

(57) ABSTRACT

A method and computer system for implementing an enhanced interactive hierarchical chart legend and data displays with hierarchical data with multiple levels. A data hierarchy display chart visualization is generated. A legend associated with and independent of the display chart visualization is generated to display the data hierarchy in full as a tree structure. The legend is provided in a collapsible tree list format; and in response to a request, using the legend, a selected portion of the data hierarchy display chart visualization is displayed, showing the data hierarchy only on certain nodes of the tree structure.

19 Claims, 11 Drawing Sheets

IMPLEMENTING INTERACTIVE HIERARACHICAL CHART LEGEND DATA DISPLAY

FIELD OF THE INVENTION

The present invention relates generally to the data processing field, and more particularly, relates to a method and computer system for implementing an enhanced interactive hierarchical data chart legend and display charts with hierarchical data with multiple levels.

DESCRIPTION OF THE RELATED ART

Displaying charts with hierarchical data with multiple levels presents challenges for displaying the hierarchy (tree-structured) data while making an efficient use of the screen space. In these charts, the data may not necessarily be graphically displayed at every level of the hierarchy.

There are two main problems faced by the user in the context of hierarchical charts: First, there is no way for the user to view the full data hierarchy without the chart wasting screen space. Second, there is no flexibility in allowing the user to view the data hierarchy only on certain nodes of the tree.

SUMMARY OF THE INVENTION

Principal aspects of the present invention are to provide a method and computer system for implementing enhanced interactive hierarchical chart legend and data displays with hierarchical data with multiple levels. Other important aspects of the present invention are to provide such method, and computer system substantially without negative effects and that overcome some of the disadvantages of prior art arrangements.

In brief, a method and computer system for implementing an enhanced interactive hierarchical chart legend and data displays with hierarchical data with multiple levels. A data hierarchy display chart visualization is generated. A legend associated with and independent of the display chart visualization is generated to display the data hierarchy in full as a tree structure. The legend is provided in a collapsible tree list format; and in response to a request, using the legend, a selected portion of the data hierarchy display chart visualization is displayed, showing the data hierarchy only on certain nodes of the tree structure.

In accordance with features of the invention, the data hierarchy display chart visualization enables visualizing both data hierarchy and change over time.

In accordance with features of the invention, generating the data hierarchy display chart visualization includes generating a stacked area chart showing a change in data over time.

In accordance with features of the invention, because the legend is in a list format, the legend conserves significantly more screen space than possible with the chart visualization.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and computer system are provided for implementing enhanced interactive hierarchical data chart legend and data display in accordance with preferred embodiments.

The present invention provides an effective method and computer system for implementing an enhanced interactive hierarchical data chart legend and data displays with hierarchical data with multiple levels.

Figure 1:
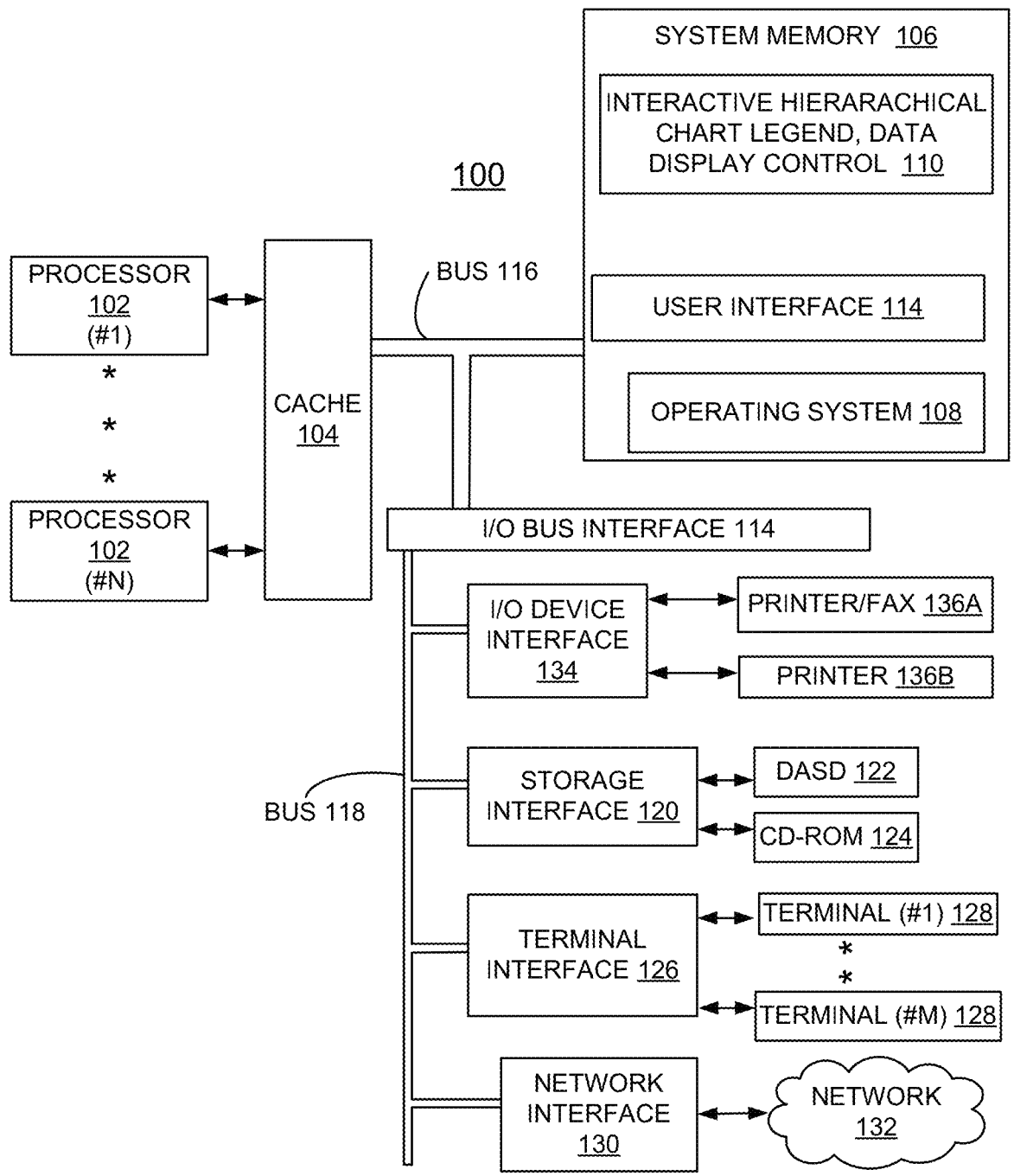
FIG. 1 is a block diagram of an example computer system for implementing enhanced interactive hierarchical data chart legend and data display in accordance with preferred embodiments.

Having reference now to the drawings, in FIG. 1, there is shown an example computer system generally designated by the reference character 100 for implementing enhanced interactive hierarchical data chart legend and data display in accordance with preferred embodiments. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106, an operating system 108, an interactive hierarchical chart legend, data display control 110 in accordance with an embodiment of the invention and a user interface 112. System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, and a I/O device interface 134 coupled to I/O devices, such as a first printer/fax 136A, and a second printer 136B.

I/O bus interface 114 communicates with multiple I/O interface units 120, 126, 130, and 134, which are also known as I/O processors (IOPs) or I/O adapters (IOAs), through system I/O bus 116. System I/O bus 116 is, for example, an industry standard PCI bus, or other appropriate bus technology.

Computer system 100 may be, for example, an IBM® eServer™ System P® computer system, running the Advanced Interactive Executive (AIX®) operating system or the LINUX® operating system.

Computer system 100 is shown in simplified form sufficient for understanding the present invention. It should be understood that the present invention is not limited to the illustrated arrangement of computer system 100.

In accordance with features of the invention, a legend associated with a data hierarchy chart visualization is used to display a full data hierarchy as a tree. The legend is arranged to be interactive to show the data hierarchy only on certain nodes of the tree in response to a specific user request.

In accordance with features of the invention, the hierarchical legend advantageously is provided in a collapsible tree list format. Because the legend is in a list format, the legend conserves significantly more screen space than possible with a chart, given that the list could also scroll. Also, as a collapsible tree, a clickable area is consistent and is not dependent on the portioned size inside the chart.

In accordance with features of the invention, using the chart legend to display the hierarchy, the legend thereby removes the dependency on the chart itself. This means that any type of chart can be used, as long as it can display the data as portions of a whole, for example, a stacked area chart showing a change in data over time, while the legend is used to display the data hierarchy.

Figure 2A:
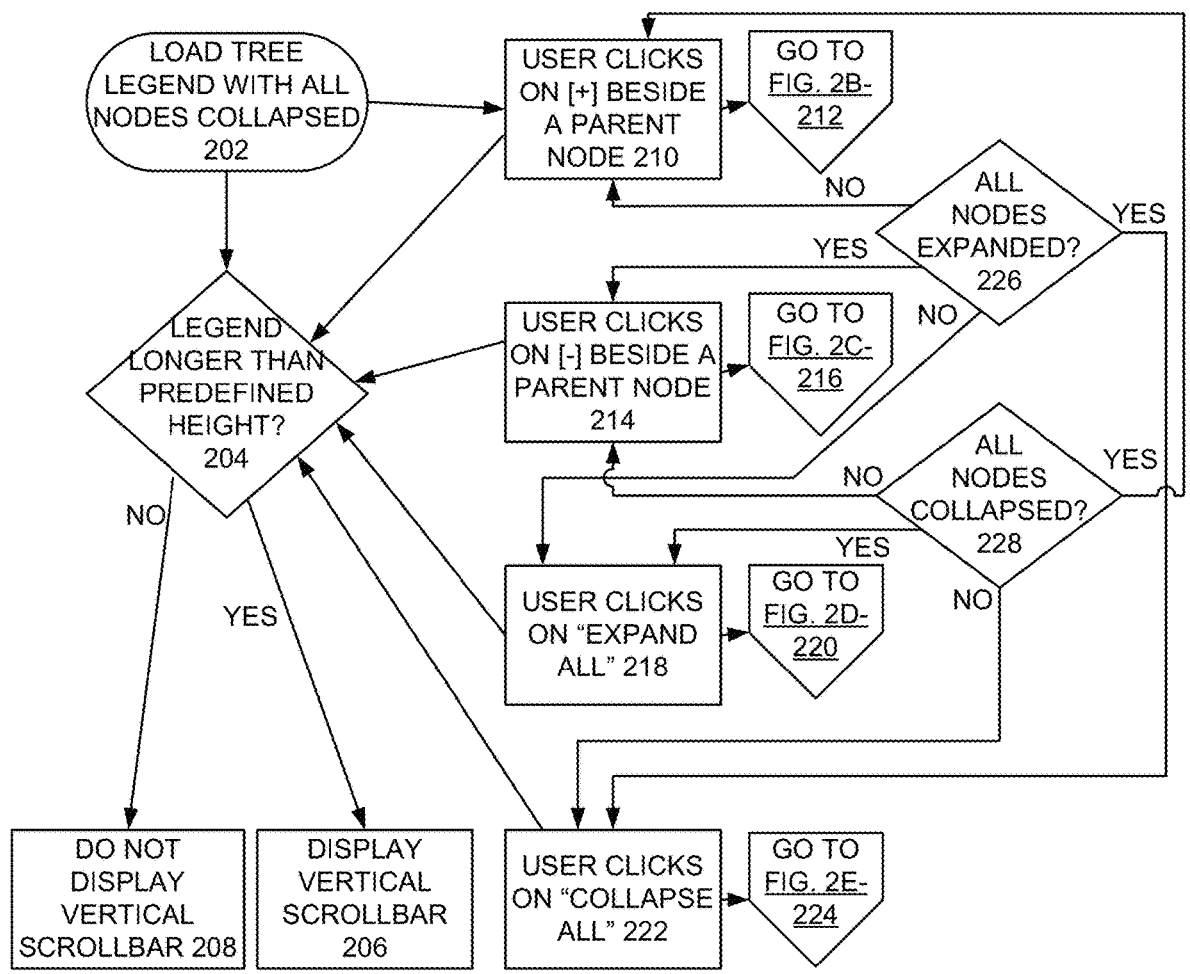
FIGS. 2A, 2B, 2C, 2D, and 2E together illustrates an example method for implementing enhanced interactive hierarchical data chart legend and data display in accordance with preferred embodiments.

Referring now to FIGS. 2A, 2B, 2C, 2D, and 2E together illustrates an example method generally designated by the reference character 200 for implementing enhanced interactive hierarchical data chart legend and data display in accordance with preferred embodiments. In FIG. 2A, starting at a block 202 an initial tree legend is loaded, for example with all nodes collapsed. Checking if the legend is longer than a predefined height, such as the height of the chart as indicated at a decision block 204. When the legend is longer than the predefined height, then a vertical scrollbar is displayed as indicated at a block 206. When the legend is shorter than the predefined height, then a vertical scrollbar is not displayed as indicated at a block 208.

Figure 2B:
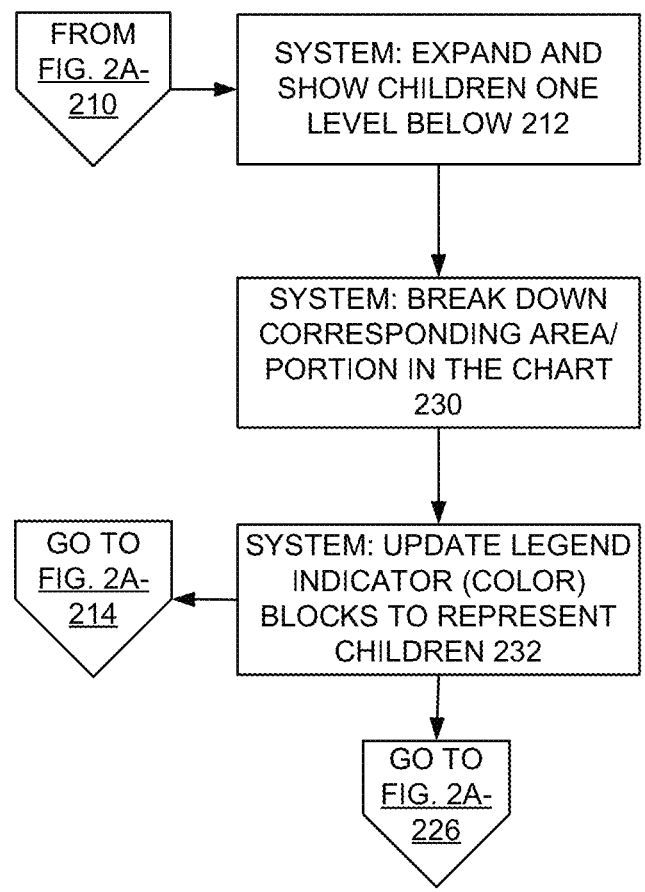
Figure 3:
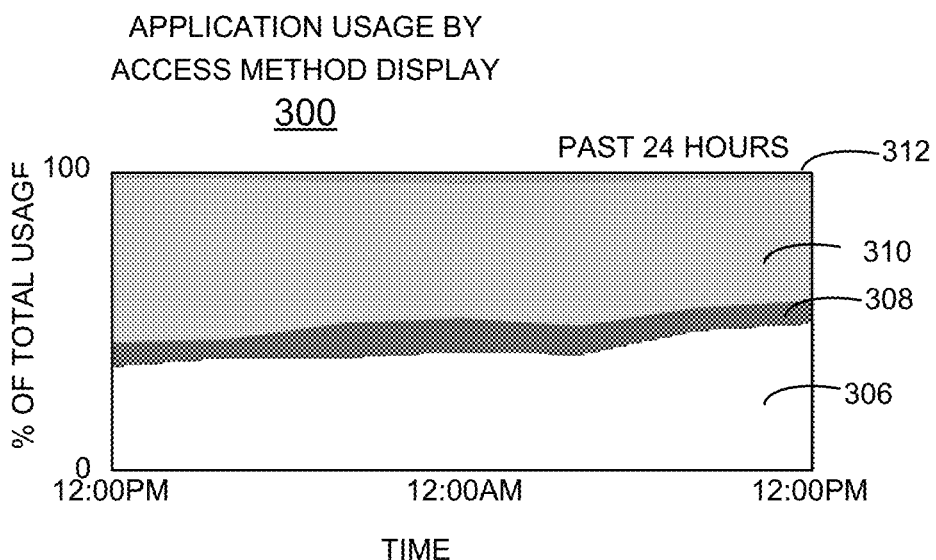
FIGS. 3, 4, 5 and 6 illustrate respective example charts with corresponding example legends for implementing enhanced interactive hierarchical data chart legend and data display in accordance with preferred embodiments.

As indicated at a block 210, an operation by a user or user selection or click on [+] on parent node of a legend, such as a parent Browser 306 in legend 302 in FIG. 3, is received. System operations continue at a block 212 in FIG. 2B.

Figure 4:
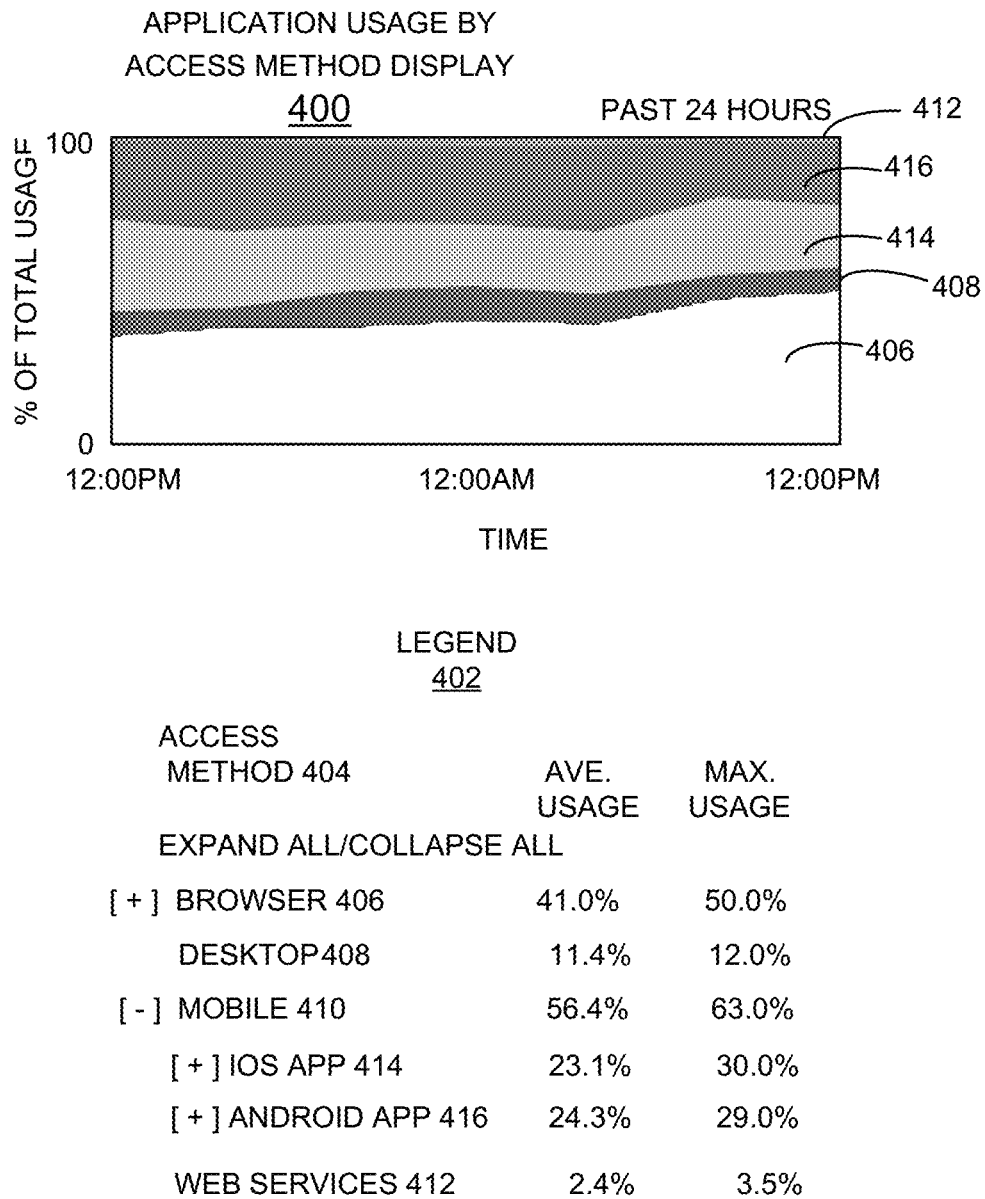

As indicated at a block 214, a user selection or click on [−] on parent node of a legend, such as a parent Mobile 410 in the legend 402 in FIG. 4, is received. System operations continue at a block 216 in FIG. 2C.

Figure 5:
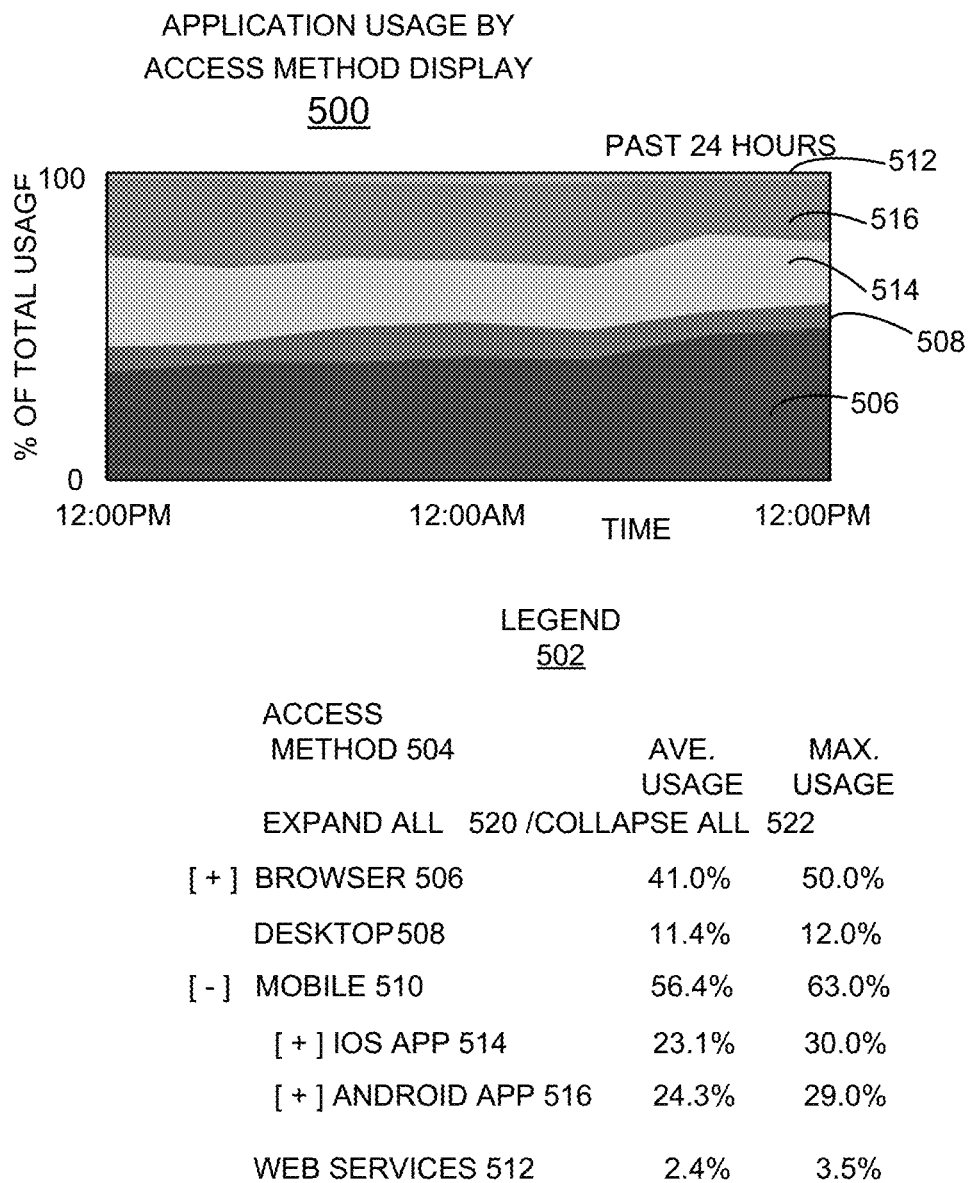

As indicated at a block 218, a user selection or click on Expand All of a legend, such as an Expand All 520 in the legend 502 in FIG. 5, is received. System operations continue at a block 220 in FIG. 2D.

As indicated at a block 222, a user selection or click on Collapse All of a legend, such as a Collapse All 522 in the legend 502 in FIG. 5, is received. System operations continue at a block 224 in FIG. 2E.

In FIG. 2B, starting at a block 212 in response to the user selection or click on [+] on parent node of a legend at block 210 in FIG. 2A, a system operation is performed to expand and show children one level below as indicated at a block 212. A system operation breaks down a corresponding area/portion of the chart, such as Display 600 shown in FIG. 6 as indicated at a block 230. The legend is updated with indicator blocks, such as color blocks to represent children as indicated at a block 232.

Then operations continue as shown in FIG. 2A at block 214 and decision block 226. As indicated at decision block 226, checking whether all nodes are expanded. If not, then operations go to blocks 210 and 218 and continue in FIG. 2A. When all nodes are expanded, then operations go to blocks 214 and 222 and continue in FIG. 2A.

Figure 2C:
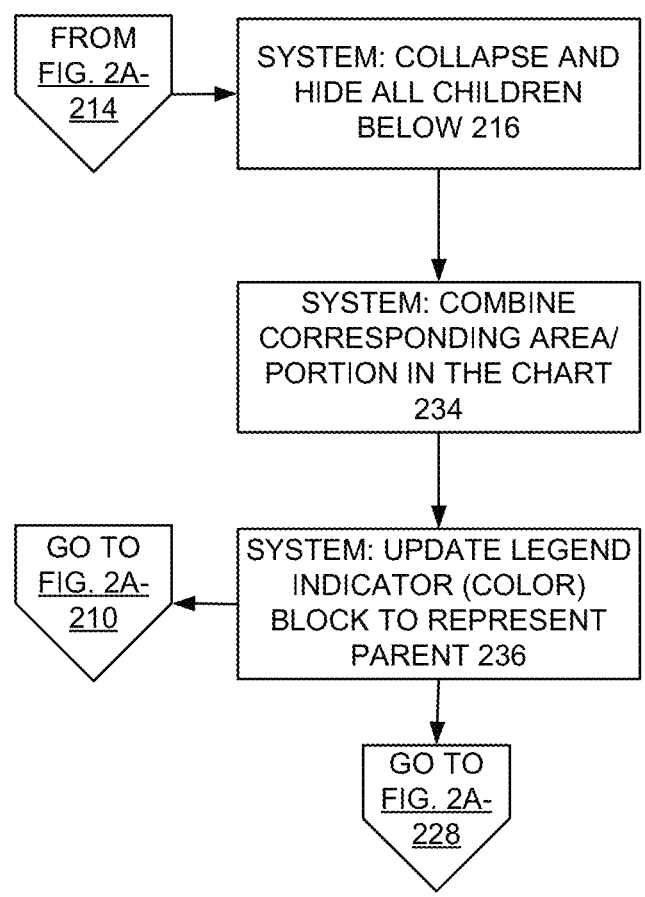

In FIG. 2C, starting at a block 216 in response to the user selection or click on [−] beside a parent node of a legend at block 214 in FIG. 2A, a system operation is performed to collapse and hide all children one level below as indicated at a block 216. A system operation combines a corresponding area/portion of the chart, such as Display 300 shown in FIG. 3 as indicated at a block 234. The legend is updated with an indicator block, such as a color block to represent the parent as indicated at a block 236.

Then operations continue as shown in FIG. 2A at block 210 and decision block 228. As indicated at decision block 228, checking whether all nodes are collapsed. If not, then operations go to blocks 214 and 222 and continue in FIG. 2A. When all nodes are collapsed, then operations go to blocks 218 and 210 and continue in FIG. 2A.

Figure 2D:
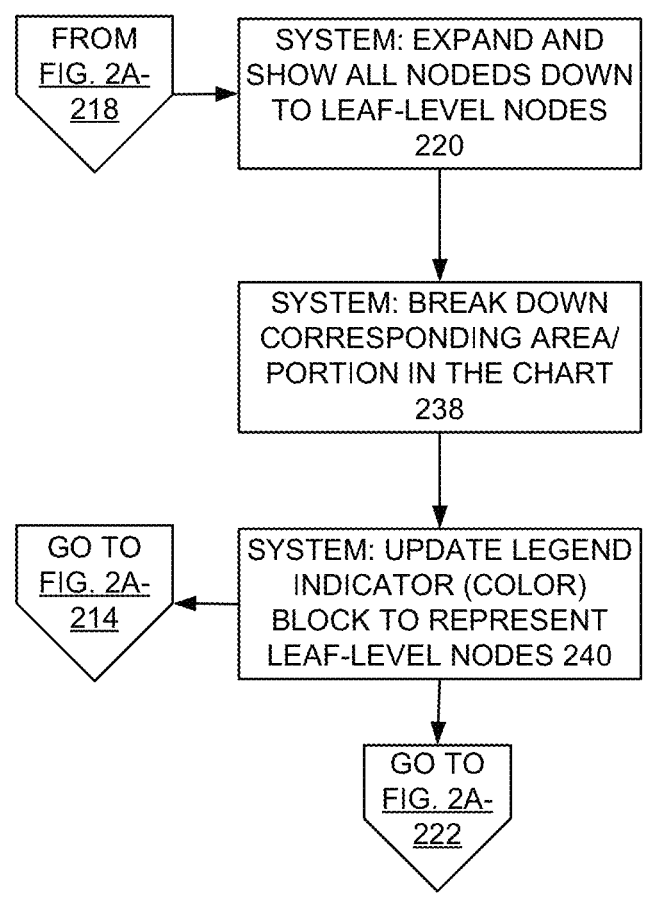

In FIG. 2D, starting at a block 220 in response to the user selection or click on expand all of a legend at block 218 in FIG. 2A, a system operation is performed to expand and show all nodes down to leaf-level nodes as indicated at a block 220. A system operation breaks down a corresponding area/portion of the chart, such as Display 500 shown in FIG. 5 as indicated at a block 238. The legend is updated with indicator blocks, such as a color blocks to represent the leaf-level nodes as indicated at a block 240. Then operations go to blocks 218 and 222 and continue in FIG. 2A.

Figure 2E:
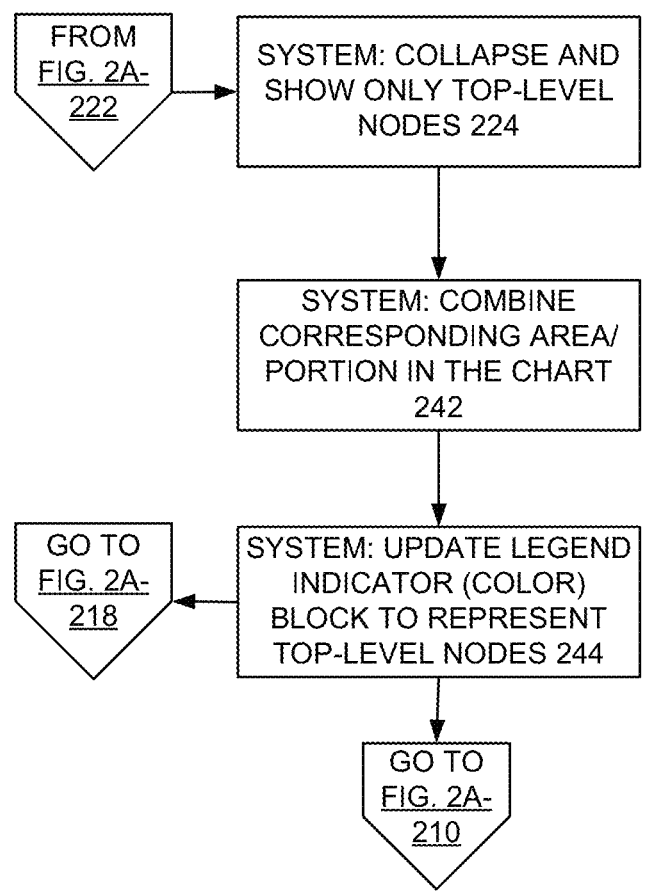

In FIG. 2E, starting at a block 224 in response to the user selection or click on collapse all of a legend at block 222 in FIG. 2A, a system operation is performed to collapse and show only top-level nodes as indicated at a block 224. A system operation combines a corresponding area/portion of the chart, such as Display 300 shown in FIG. 3 as indicated at a block 242. The legend is updated with indicator blocks, such as a color blocks to represent top-level nodes as indicated at a block 244. Then operations go to blocks 210 and 218 and continue in FIG. 2A.

Referring now to FIGS. 3, 4, 5 and 6, there are shown respective example charts with legends for implementing enhanced interactive hierarchical data chart legend and data display in accordance with preferred embodiments.

In FIG. 3, an example chart 300 is shown with a corresponding example legend 302. Display 300 includes a stacked area chart illustrating total usage of an application broken down by various access methods over a time period. The present invention allows the user to view the legend 302 for the hierarchical data in a hierarchical tree format, for example, including nodes Browser 306, Desktop 308, Mobile 310, and Web Services 312. As shown, all parent nodes, such as the Browser 306 and, Mobile 310 are expandable, indicated by a selection indicator or [+] icons, with all nodes collapsed in the default state. This means that only the top-level nodes are displayed in the legend 302 and are graphically represented in the chart 300.

In FIG. 4, an example chart 400 is shown with a corresponding example legend 402. Legend 402 for the hierarchical data in a hierarchical tree format, for example, including nodes Browser 406, Desktop 408, Mobile 410, and Web Services 412. Once the user clicks on the [+] icon, the legend reveals the child nodes, for example, indented beneath the parent. In this example, expanding the Mobile 410 access method reveals the sub methods, which are by iOS app 414 and Android app 416. By doing this action in chart 400, the corresponding chart area and legend indicator blocks, such as legend color blocks are also updated to represent the child-level data. In chart 400, the node Mobile 410 that was expanded no longer has a color representation, and the previous area in the chart is broken down to represent the child-level data iOS app 414 and Android app 416 series over time. Conversely, the user can click on the [−] to hide the child nodes and revert to the parent-level data representation in the chart area.

In FIG. 5, an example chart 500 is shown with a corresponding example legend 502. Legend 502 includes nodes Browser 506, Desktop 508, Mobile 510, Web Services 512, and sub-methods, iOS app 514 and Android app 516. As shown, legend 502 provides the user with an option at the top to Expand All 520 or Collapse All 522 of the tree nodes. This provides a convenient way of expanding or collapsing all nodes without having to manually expand or collapse each node in the tree.

Figure 6:
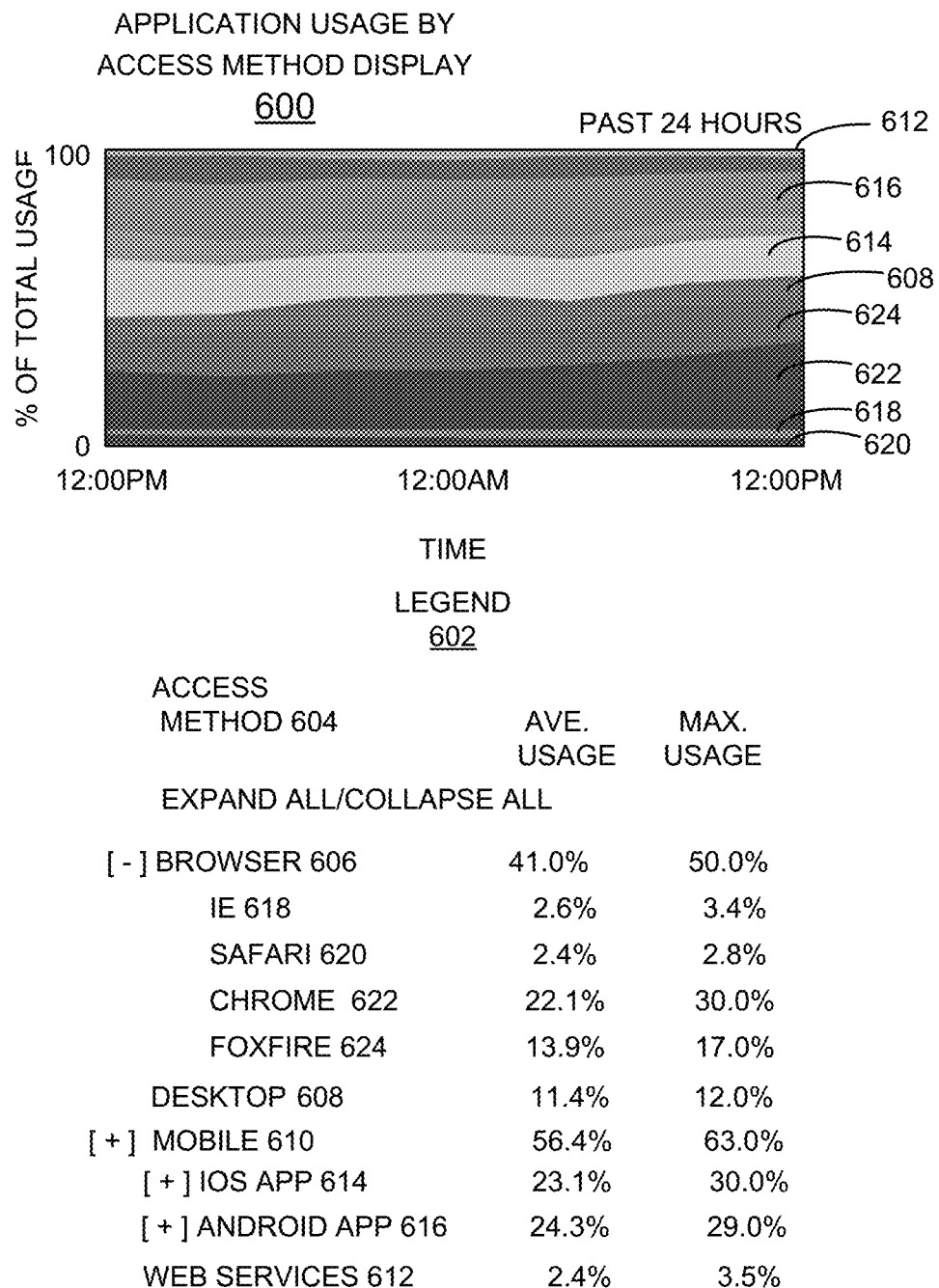

In FIG. 6, an example chart 600 is shown with a corresponding example legend 602. Once the user clicks on the Expand All 520 option, the legend expands all of the nodes and reveals the full hierarchical tree. The chart displays the data at the leaf-level nodes of the tree. If the list becomes too long to fit within the height of the chart, a vertical scroll bar appears so the user can scroll through the list, as illustrated at blocks 206 in FIG. 2A. This way, the legend does not take up more screen estate than is necessary. Legend 602 includes nodes Browser 606, Desktop 608, Mobile 610, Web Services 612, and sub-methods, IE 614, Safari 616, Chrome 620 and Firefox 622. If the user clicks on the Collapse All 522 option, the legend and chart will revert to the way it was in the default state, only displaying the top-level nodes and the corresponding data in the chart, for example, as shown in FIG. 3.

In accordance with features of the invention, flexibility is enabled since the invention can be used in conjunction with generally any type of chart that can display data as portions of a whole. Each of the respective examples shown in FIGS. 3, 4, 5 and 6 is a stacked area chart, but the visualization of the invention could also be used with a stacked bar chart, pie chart, or even with a sunburst or tree map, depending on a specific application. With a sunburst or tree map, the legend can act as an aid to display the hierarchy, while allowing interaction inside the legend for better usability.

Figure 7:
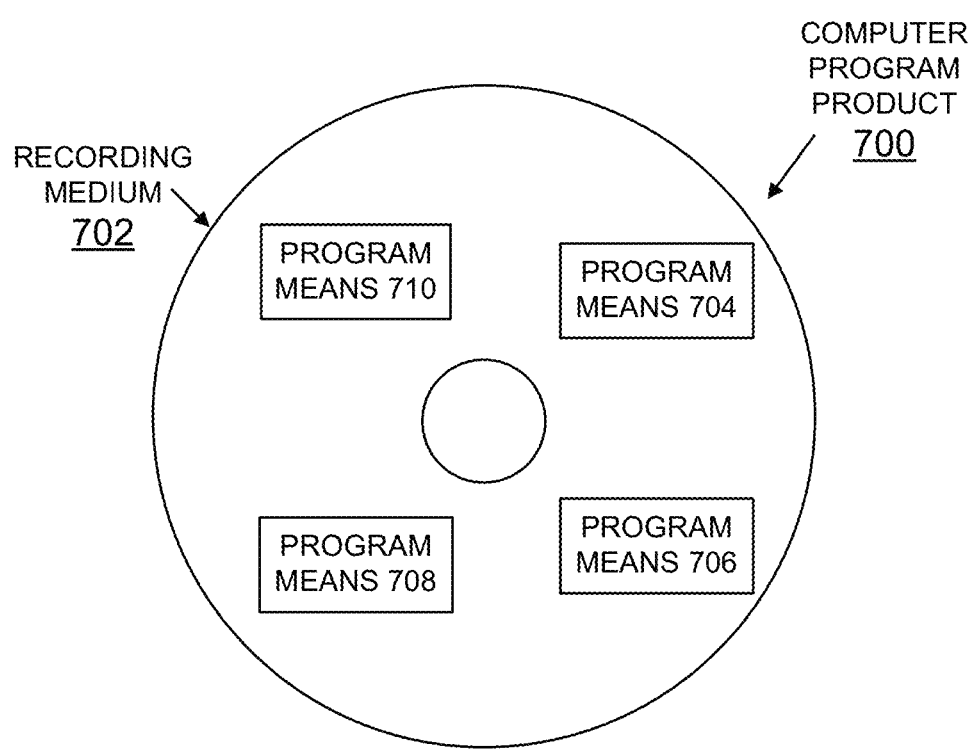
FIG. 7 is a block diagram illustrating a computer program product in accordance with the preferred embodiment.

Referring now to FIG. 7, an article of manufacture or a computer program product 700 of the invention is illustrated. The computer program product 700 is tangibly embodied on a non-transitory computer readable storage medium that includes a non-transitory recording medium 702, such as, a hard drive, a floppy disk, a high capacity read only memory in the form of an optically read compact disk or CD-ROM, a tape, or another similar computer program product. Recording medium 702 stores program means 704, 706, 708, and 710 on the medium 702 for carrying out the methods for implementing enhanced interactive hierarchical data chart legend and data display in computer system 100 of FIG. 1.

A sequence of program instructions or a logical assembly of one or more interrelated modules defined by the recorded program means 704, 706, 708, and 710, direct the computer system 100 for implementing enhanced interactive hierarchical data chart legend and data display.

While the present invention has been described with reference to the details of the embodiments of the invention shown in the drawing, these details are not intended to limit the scope of the invention as claimed in the appended claims.

What is claimed is:

1. A computer-implemented method for implementing enhanced interactive hierarchical chart legend and data display with hierarchical data with multiple levels, said computer-implemented method comprising:
generating a data hierarchy display chart visualization;
generating an interactive legend associated with and independent of the data hierarchy display chart visualization; the generated interactive legend to display the data hierarchy in full as a tree structure; the generated interactive legend having a collapsible tree list format including a plurality of nodes, the list format enabling the user to view the full data hierarchy while conserving screen space than possible with the data hierarchy display chart visualization;
in response to a user request, using the generated interactive legend, to display a selected portion of the data hierarchy display chart visualization, showing the data hierarchy only on certain user selected one or more nodes of the tree structure; and
selectively providing a vertical scroll bar with the generated interactive legend for enabling a user to scroll through all nodes of the full hierarchical tree.

2. The computer-implemented method as recited in claim 1 wherein generating the data hierarchy display chart visualization includes enabling visualization of both data hierarchy and change over time.

3. The computer-implemented method as recited in claim 1 wherein generating the data hierarchy display chart visualization includes at least one of selectively breaking down and combining portions of an area chart for showing resulting portions of display data over a selected period of time.

4. The computer-implemented method as recited in claim 1 wherein generating the interactive legend associated with and independent of the data hierarchy display chart visualization includes providing all nodes collapsed in an initial legend displaying only the top-level nodes and generating the data hierarchy display chart visualization to graphically represent only the top-level nodes.

5. The computer-implemented method as recited in claim 1 wherein generating the interactive legend associated with and independent of the data hierarchy display chart visualization; the generated legend to display the data hierarchy in full as a tree structure includes providing at least one predefined icon with all parent nodes in the interactive legend.

6. The computer-implemented method as recited in claim 1 wherein, in response to the request, using the generated interactive legend, to display a selected portion of the data hierarchy display chart visualization, showing the data hierarchy only on certain nodes of the tree structure includes a user selection of a predefined icon provided with a parent node in the interactive legend to expand and show children nodes below the parent node in the interactive legend, and update data hierarchy display chart visualization to represent children-level data.

7. The computer-implemented method as recited in claim 6 includes a user selection of another predefined icon provided with a parent node in the interactive legend to collapse and hide children nodes below the parent node in the interactive legend, and update data hierarchy display chart visualization to represent parent-level data.

8. The computer-implemented method as recited in claim 1 wherein, in response to the request, using the generated interactive legend, to display a selected portion of the data hierarchy display chart visualization, showing the data hierarchy only on certain nodes of the tree structure includes a user selection of an expand all option provided in the interactive legend to expand and show nodes of the full hierarchical tree in the interactive legend, and update data hierarchy display chart visualization to represent all nodes of the full hierarchical tree.

9. The computer-implemented method as recited in claim 1 wherein, in response to the request, using the generated interactive legend, to display a selected portion of the data hierarchy display chart visualization, showing the data hierarchy only on certain nodes of the tree structure includes a user selection of a collapse all option provided in the interactive legend for providing all nodes collapsed in the interactive legend displaying only the top-level nodes and generating the data hierarchy display chart visualization to graphically represent only the top-level nodes.

10. A computer system for implementing an enhanced interactive hierarchical chart legend and data displays with hierarchical data with multiple levels comprising:
   a processor;
   an interactive hierarchical chart legend and data display control;
   the processor using the interactive hierarchical chart legend and data display control for generating a data hierarchy display chart visualization;
   generating an interactive legend associated with and independent of the data hierarchy display chart visualization; the generated interactive legend to display the data hierarchy in full as a tree structure; the generated interactive legend having a collapsible tree list format including a plurality of nodes, the list format enabling the user to view the full data hierarchy while conserving more screen space than possible with the data hierarchy display chart visualization;
   in response to a user request, using the generated interactive legend, to display a selected portion of the data hierarchy display chart visualization, showing the data hierarchy only on certain user selected one or more nodes of the tree structure; and
   selectively providing a vertical scroll bar with the generated interactive legend for enabling a user to scroll through all nodes of the full hierarchical tree.

11. The system as recited in claim 10 includes control code stored on a computer readable medium, and wherein said processor uses the control code for implementing the enhanced interactive hierarchical chart legend and data displays.

12. The system as recited in claim 10 wherein generating the data hierarchy display chart visualization includes enabling visualization of both data hierarchy and change over time.

13. The system as recited in claim 10 wherein generating the data hierarchy display chart visualization includes generating a stacked area chart showing a change in data over a selected period of time.

14. The system as recited in claim 10 wherein generating the interactive legend associated with and independent of the data hierarchy display chart visualization includes providing all nodes collapsed in an initial legend displaying only the top-level nodes and generating the data hierarchy display chart visualization to graphically represent only the top-level nodes.

15. The system as recited in claim 10 wherein generating the interactive legend associated with and independent of the data hierarchy display chart visualization; the generated interactive legend to display the data hierarchy in full as a tree structure includes providing at least one predefined icon with all parent nodes in the interactive legend.

16. The system as recited in claim 10 wherein, in response to the request, using the generated interactive legend, to display a selected portion of the data hierarchy display chart visualization, showing the data hierarchy only on certain nodes of the tree structure includes a user selection of a predefined icon provided with a parent node in the generated interactive legend to expand and show children nodes below the parent node in the generated interactive legend, and update data hierarchy display chart visualization to represent children-level data.

17. The system as recited in claim 16 includes a user selection of another predefined icon provided with a parent node in the generated interactive legend to collapse and hide children nodes below the parent node in the generated interactive legend, and update data hierarchy display chart visualization to represent parent-level data.

18. The system as recited in claim 10 wherein, in response to the request, using the generated interactive legend, to display a selected portion of the data hierarchy display chart visualization, showing the data hierarchy only on certain nodes of the tree structure includes a user selection of an expand all option provided in the generated interactive legend to expand and show nodes of the full hierarchical tree in the generated interactive legend, and update data hierarchy display chart visualization to represent all nodes of the full hierarchical tree.

19. The system as recited in claim 10 wherein, in response to the request, using the generated interactive legend, to display a selected portion of the data hierarchy display chart visualization, showing the data hierarchy only on certain nodes of the tree structure includes a user selection of a collapse all option provided in the generated interactive legend for providing all nodes collapsed in the generated interactive legend displaying only the top-level nodes and generating the data hierarchy display chart visualization to graphically represent only the top-level nodes.

* * * * *